US009026356B2

(12) United States Patent
Tan

(10) Patent No.: US 9,026,356 B2
(45) Date of Patent: May 5, 2015

(54) VEHICLE NAVIGATION SYSTEM AND METHOD

(71) Applicant: Nissan North America, Inc., Franklin, TN (US)

(72) Inventor: Adrian K. Tan, Northville, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 13/774,849

(22) Filed: Feb. 22, 2013

(65) Prior Publication Data

US 2014/0244157 A1 Aug. 28, 2014

(51) Int. Cl.
G01C 21/34 (2006.01)
G08G 1/16 (2006.01)
G01C 21/36 (2006.01)
G08G 1/0968 (2006.01)

(52) U.S. Cl.
CPC ............ *G08G 1/167* (2013.01); *G01C 21/3658* (2013.01); *G01C 21/3691* (2013.01); *G08G 1/096827* (2013.01); *G08G 1/096844* (2013.01)

(58) Field of Classification Search
CPC .................. G08G 1/096827; G08G 1/096844; G08G 1/167; G01C 21/3492; G01C 21/3658; G01C 21/3691

USPC ......................................... 701/414, 423, 514
See application file for complete search history.

(56) References Cited

U.S. PATENT DOCUMENTS

| 7,219,012 | B2* | 5/2007 | Yoshikawa et al. ........... 701/423 |
|---|---|---|---|
| 7,411,486 | B2 | 8/2008 | Gern et al. |
| 7,783,420 | B2 | 8/2010 | Oonishi et al. |
| 7,801,659 | B2* | 9/2010 | Leineweber et al. ............ 701/96 |
| 8,073,618 | B2* | 12/2011 | Harumoto et al. ............. 701/414 |
| 2013/0190964 | A1* | 7/2013 | Uehara ............................ 701/25 |
| 2013/0191003 | A1* | 7/2013 | Hahne et al. .................... 701/99 |

* cited by examiner

*Primary Examiner* — John Q Nguyen
*Assistant Examiner* — Anshul Sood
(74) *Attorney, Agent, or Firm* — Global IP Counselors, LLP

(57) ABSTRACT

A vehicle navigation method comprises determining a present location of a host vehicle, including a road on which the host vehicle is traveling, determining a navigation route based on a destination and the present location of the vehicle, and determining a next navigation maneuver based on the navigation route and the present location of the host vehicle. The method further comprises capturing road information pertaining to the road, determining a present lane of the road in which the host vehicle is traveling based on the captured road information, determining a traffic condition on the road, and operating a computer to modify the next navigation maneuver based on the navigation route, the present lane and the traffic condition.

26 Claims, 7 Drawing Sheets

VEHICLE NAVIGATION SYSTEM AND METHOD

BACKGROUND

1. Field of the Invention

The present invention generally relates to a vehicle navigation system and method. More particularly, the present invention relates to a vehicle navigation system and method which are capable of modifying a navigation maneuver performed by a vehicle based on factors such as the navigation route of the vehicle, the present lane of a road in which the vehicle is traveling and the traffic condition of the road.

2. Background Information

In recent years, many vehicles include driver assistance features such as navigation systems. Conventional vehicle navigation systems are capable of calculating routes to planned destinations that could be entered, for example, by a user such as the driver of the vehicle. However, due to the limitations on global positioning systems (GPS) and the like, the navigation systems are incapable of precisely positioning a vehicle on a roadway. Thus, current navigation systems are incapable of precisely determining the lane in which a vehicle is traveling on a multi-lane highway. Furthermore, in urban areas having many high-rise buildings, GPS coverage may be temporarily lost while the vehicle is traveling between the buildings. Accordingly, these navigation systems may include "dead reckoning" features which receive information from, for example, a steering wheel position sensor, the vehicle speedometer, and gyroscopes on the vehicle, and perform interpolation algorithms based on this information to update the location of the vehicle while GPS signals are inaccurate or unavailable.

Accordingly, a need exists for an improved vehicle navigation system.

SUMMARY

In accordance with one aspect of the present invention, a vehicle navigation method comprises determining a present location of a host vehicle, including a road on which the host vehicle is traveling, determining a navigation route based on a destination and the present location of the vehicle, and determining a next navigation maneuver based on the navigation route and the present location of the host vehicle. The method further comprises capturing road information pertaining to the road, determining a present lane of the road in which the host vehicle is traveling based on the captured road information, determining a traffic condition on the road, and operating a computer to modify the next navigation maneuver based on the navigation route, the present lane and the traffic condition.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
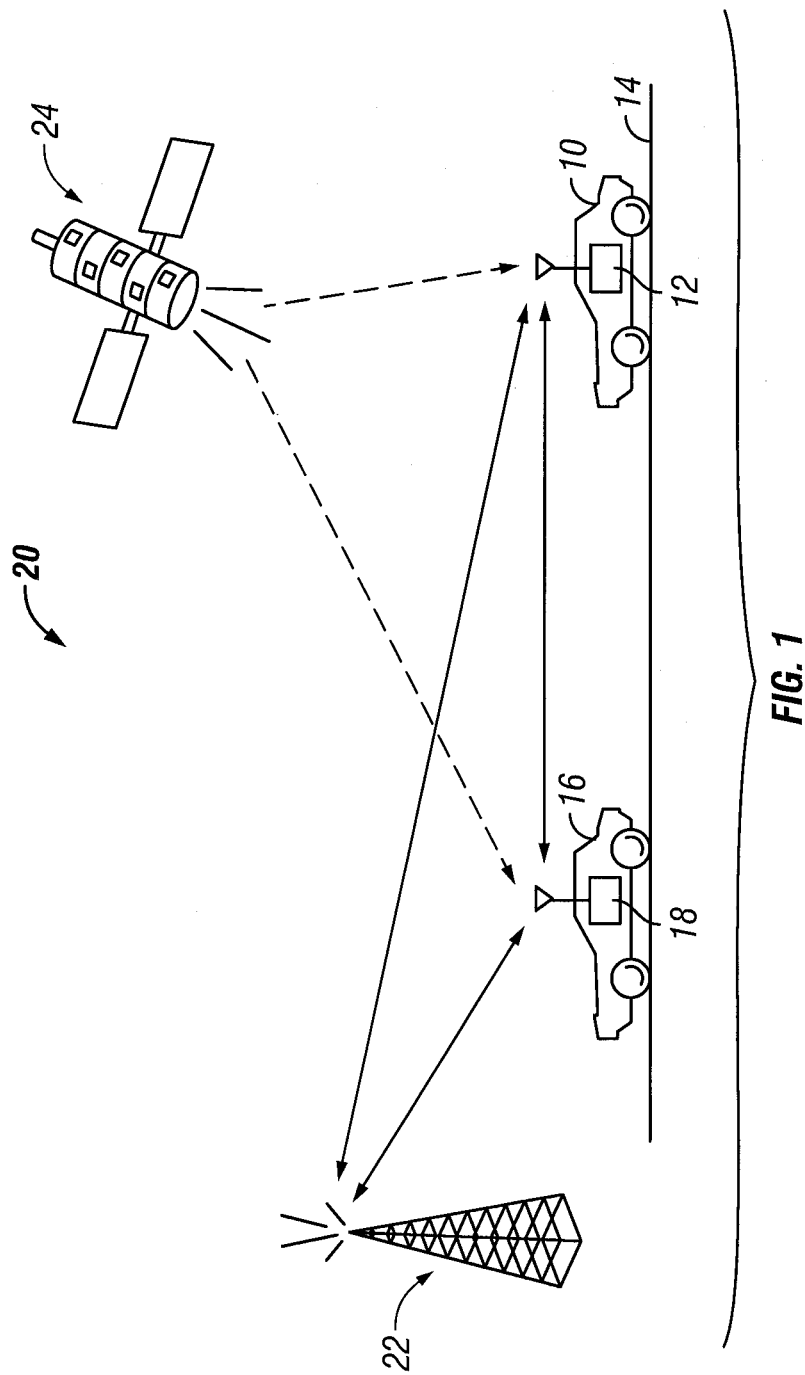
FIG. 1 is a diagrammatic view illustrating an example of a vehicle equipped with an vehicle navigation system according to a disclosed embodiment traveling on a road along with a neighboring vehicle, and being capable to communicate with the neighboring vehicle, a navigation network and a communication network.
Figure 2:
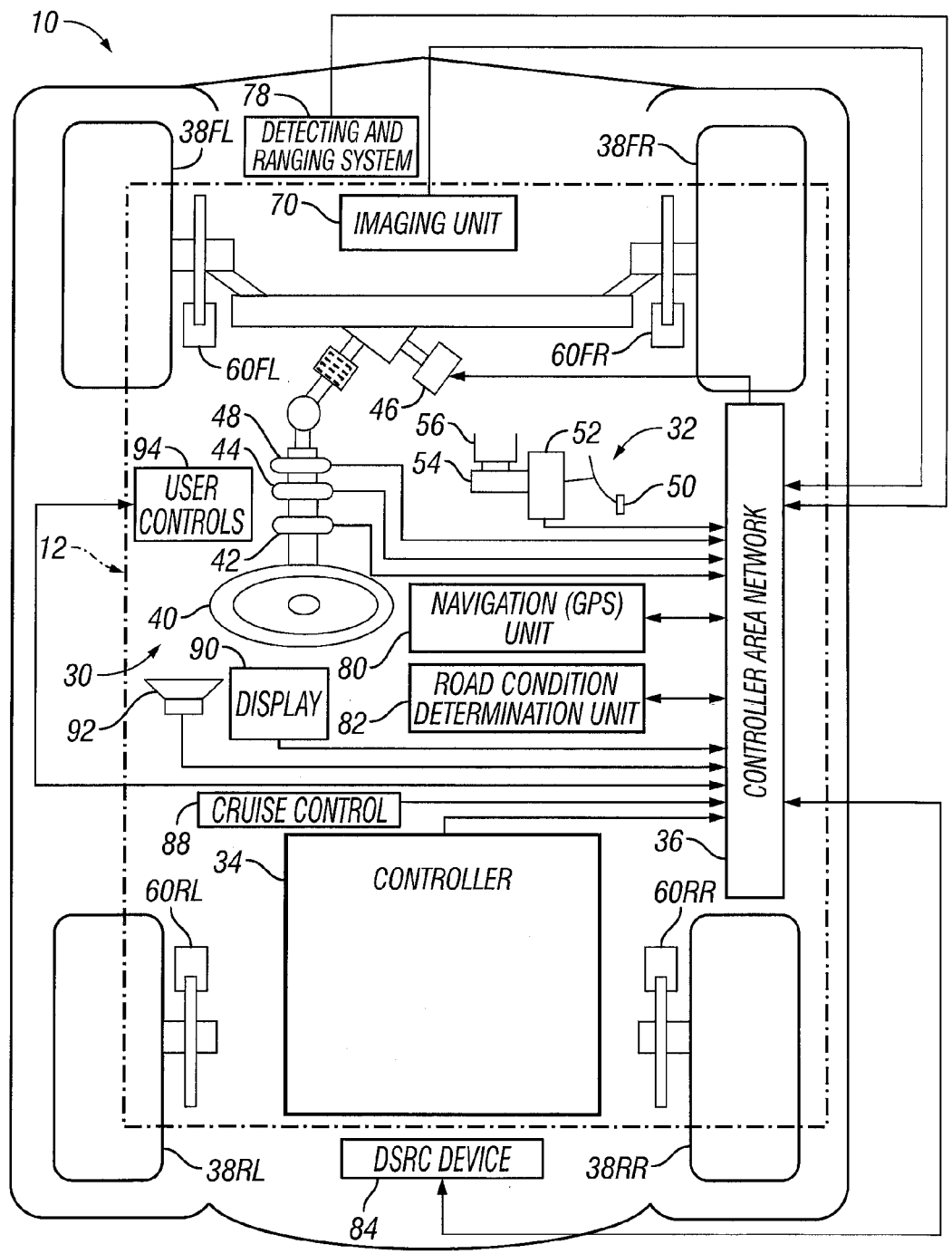
FIG. 2 is a block diagram illustrating an example of an vehicle equipped with a vehicle navigation system according to a disclosed embodiment.

FIGS. 1 and 2 illustrate an example of a host vehicle 10 equipped with a vehicle navigation system 12 according to a disclosed embodiment. As shown in FIG. 1, the host vehicle 10 is traveling on a road 14. One or more neighboring vehicles 16 can also be traveling on the road 14. The neighboring vehicle 16 can include a communication system 18, which can include a vehicle navigation system 12 as discussed herein, or other types of communication devices that enable the neighboring vehicle 16 to communicate with the vehicle navigation system 12 of the host vehicle 10. Furthermore, as discussed in more detail below, the vehicle navigation system 12 in the host vehicle 10, and the communication system 18 in the neighboring vehicle 16, can communicate with a communication network 20 that can include, for example, terrestrial wireless communication devices 22 such as mobile service communication devices, and satellite communication devices 24 such as satellites in a global positioning system (GPS), as known in the art.

In the diagram of FIG. 2, the host vehicle 10 is basically equipped with a steering system 30, a braking system 32 and an onboard controller 34 that is capable of performing the operations of the embodiments disclosed herein. The controller 34 preferably includes a microcomputer with a control program that controls the components of the vehicle navigation system 12 as discussed below. The controller 34 includes other conventional components such as an input interface circuit, an output interface circuit, and storage devices such as a ROM (Read Only Memory) device and a RAM (Random Access Memory) device. The microcomputer of the controller 34 is at least programmed to control the vehicle navigation system 12 in accordance with the flow chart of FIG. 4 as discussed below. It will be apparent to those skilled in the art from this disclosure that the precise structure and algorithms for the controller 34 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 34 can communicate with the other components of the vehicle navigation system 12 discussed herein in any suitable manner as understood in the art.

The host vehicle 10 can further include, for example, a communication network such as a controller area network (CAN) 36 to operatively connect the steering system 30, the braking system 32, the controller 34 and other components as discussed herein. The steering system 30 is thus capable of steering the left front wheel 38FL and the right front wheel 38FR as understood in the art. Also, the braking system 32 is capable of controlling the brakes at the left front wheel 38FL, the right front wheel 38FR, the left rear wheel 38RL and the right rear wheel 38RR as understood in the art.

As can be appreciated by one skilled in the art, the steering system 30 is preferably a hydraulic operated steering system including, among other things, a steering wheel 40, a torque sensor 42, a steering angle sensor 44, a steering motor 46 and a turn signal switch 48. The torque sensor 42, the steering angle sensor 44, the steering motor 46 and the turn signal switch 48 provide signals to the controller 34 via, for example, the CAN 36 for purposes as discussed herein. Generally, the steering system 30 can be a relatively conventional steering system, and thus, the steering system 30 will not be discussed in further detail herein.

The braking system 32 can be any type of conventional braking system such as a brake-by-wire system including, among other things, a brake pedal 50, a booster 52, a master cylinder 54 and a reservoir 56. In the illustrated embodiment, the braking system 32 is a hydraulically operated braking system that includes a pair of front wheel cylinders 60FL and 60FR and a pair of rear wheel cylinders 60RL and 60RR. The braking system 32 allows independent control of a braking force at the front and rear wheels and the left and right wheels. Generally, the braking system 32 can be a relatively conventional braking system, and thus, the braking system 32 will not be discussed in further detail herein.

Figure 3:
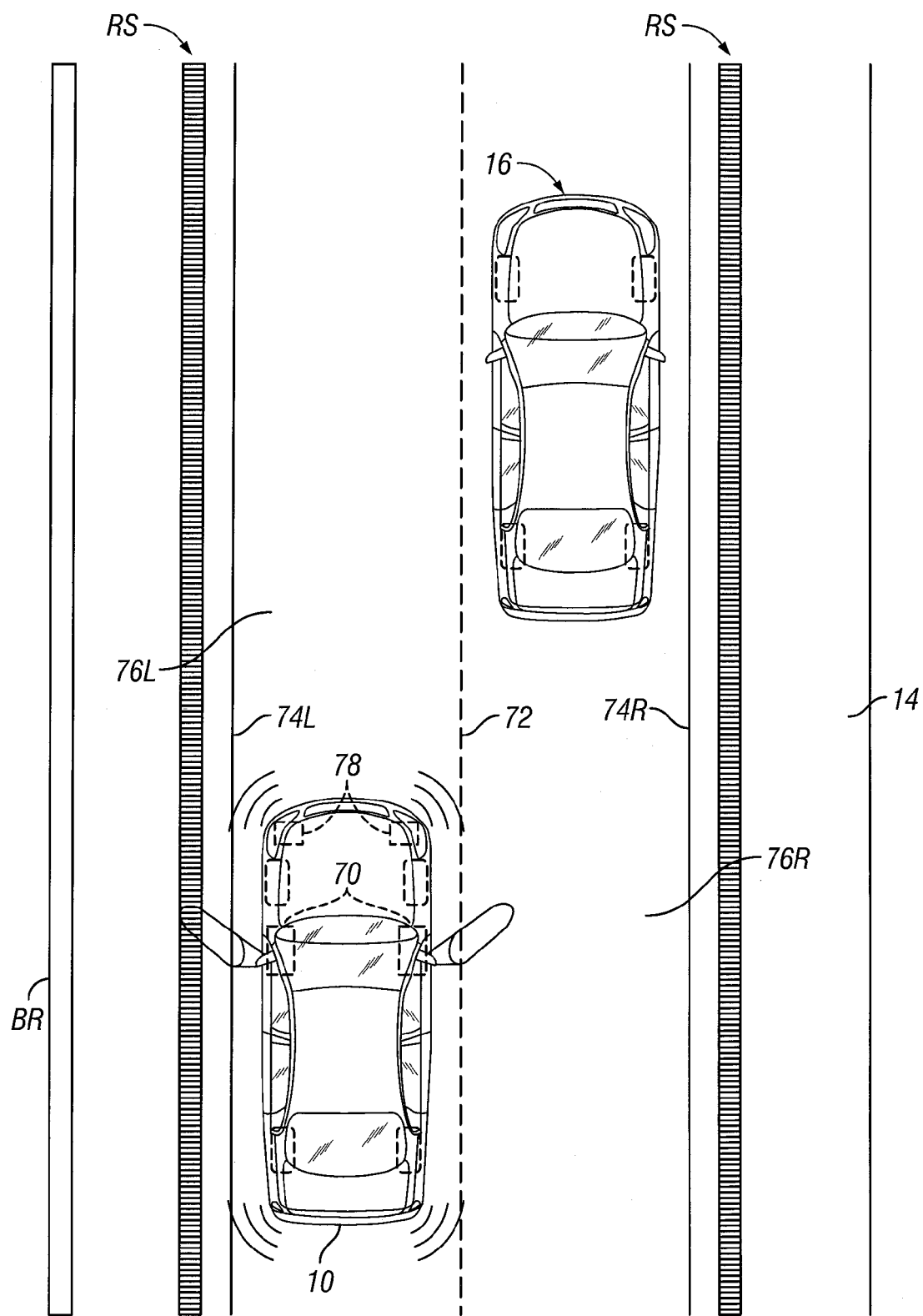
FIG. 3 is a diagrammatic view of the vehicle shown in FIGS. 1 and 2 traveling along a road.

The host vehicle 10 further includes at least one imaging unit 70 that has a picture processing function and preferably includes at least one CCD (Charge Coupled Device) camera, for example, and a camera controller as object recognition sensors for detecting the position of the host vehicle 10 within a driving lane of the road 14 in order to evaluate the location of the host vehicle 10 and the surroundings of the host vehicle 10 as discussed herein. The imaging unit 70 can be configured to pick up an image with a monocular (single-lens) camera composed of a CCD (Charge Coupled Device) camera, for example. The imaging unit 70 is preferably disposed on the front of the host vehicle 10, but can be disposed at any suitable location on the host vehicle 10. Also, multiple imaging units 70 can be disposed at different locations on the host vehicle 10. For example, as shown in FIG. 3, the host vehicle 10 can be equipped with cameras installed on the driver and passenger side mirrors.

Thus, the imaging unit 70 provides captured image signals to the controller 34 via, for example, the CAN 36 or in any other suitable manner. The controller 34 can therefore evaluate these signals as discussed herein to determine, for example, the position of the host vehicle 10 on the road 14, the presence of obstacles such as neighboring vehicles 16, and so on. For example, the captured image information can include images of braking lights of neighboring vehicles 16, headlights of approaching neighboring vehicles 16, road signs and so on. Also, the captured image information can include images of a center lane line 72 on the road 14, an outside peripheral lane line 74R (right lane line) and an inside peripheral lane line 74L (left lane line) on the road 14, rumble strips RS, and the presence of a neighboring vehicle 16 as shown in FIG. 3. The controller 34 can therefore ascertain from this image information whether the host vehicle 10 is traveling in the outside peripheral (right) lane 76R or the inside peripheral (left) lane 76L of the road 14, or at any other position on the road 14 as discussed herein. Furthermore, based on the signals from the imaging unit 70, the controller 34 can calculate the angle (yaw angle) formed by the driving lane 76R or 76L of the host vehicle 10 and the longitudinal axis of the host vehicle 10, the lateral displacement from the center of the driving lane 76R or 76L, the driving lane curvature, the lane width, and so forth in any manner as understood in the art for the reasons discussed herein.

The host vehicle 10 also includes a detecting-and-ranging system 78, such as a LIDAR (light detection and ranging) system, a RADAR (radio detection and ranging) system, and/or a SONAR (sound navigation and ranging) system, to name a few, that operates to detect a position of neighboring barriers BR, such as walls along the road 14, and neighboring vehicles 16 with respect to the host vehicle 10 as understood in the art. Thus, the detecting-and-ranging system 78 provides information pertaining to these obstacles to the controller 34 via, for example, the CAN 36 or in any other suitable manner. The controller 34 can therefore evaluate this information as discussed herein to determine, for example, the position of the host vehicle 10 on the road 14, such as whether the host vehicle 10 is in the outside peripheral (right) lane 76R or the inside peripheral (left) lane 76L of the road 14, or at any other position on the road 14 as discussed herein. The controller 34 can also evaluate this information as discussed herein to determine, for example, the presence of a rumble strips RS, the presence of obstacles such as barriers BR, neighboring vehicles 16, and so on. Consistent detection of a stationary object, such as a barrier BR, next to the host vehicle 10 indicates an outer boundary, which enables the controller 34 to determine that the host vehicle 10 is in a peripheral lane of the road 14. For instance, usually the presence of a barrier BR will indicate that the host vehicle 10 is in an inside peripheral lane bordering a lane of opposing traffic, such as the left lane 76L as shown in FIG. 3. Also, consistent detection of the absence of objects next to the host vehicle 10 typically indicates that the host vehicle 10 is in the outside peripheral lane, which in this example is the right lane 76R as shown in FIG. 3.

The host vehicle 10 further includes a navigation unit 80 that is configured and arranged to output road information to the controller 34. Preferably, the navigation unit 80 communicates with the communication network 20, such as the terrestrial wireless communication devices 22 and satellite communication devices 24 as shown in FIG. 1, to receive GPS information, mapping information, traffic information, accident information and so on. The navigation unit 80 provides navigation information to the controller 34 via, for example, the CAN 36 or in any suitable manner. The controller 34 can thus use this information to determine the location of the host vehicle 10, and the pattern of the road 14 including the locations of intersections, the locations of exits, the type of the road, such as the number of lanes and whether the road 14 is an ordinary road or an expressway, and so on.

The host vehicle 10 also includes a road condition determination unit 82 that is configured and arranged to determine a road condition based on various inputs from vehicle sensors (not shown) and/or the navigation unit 80. For example, the road condition determination unit 82 can determine based on, for example, signals from the vehicle wipers (not shown) whether the road is wet due to rain and the general intensity of the rain based on the speed of the wipers. The road condition determination unit 82 can also receive signals indicating whether the headlights (not shown) of the vehicle 10 are on, and the intensity of the headlights, which can indicate whether the vehicle 10 is traveling during the day, at night, or in inclement conditions. The road condition determination unit 82 can also determine the traction condition of the road 14 based on, for example, signals received from a traction control device (not shown) on the host vehicle 10 which indicate whether the vehicle tires are having difficulty in maintaining traction with the road 14. The road condition determination unit 82 can further receive signals from the vehicle thermometer (not shown) which can indicate whether the road 14 may be experiencing snow or freezing conditions. The road condition determination unit 82 provides all of this information to the controller 34 via, for example, the CAN 36 or in any suitable manner. The controller 34 can thus use this information to determine the travel conditions of the host vehicle 10 on the road 14 as discussed herein.

The host vehicle 10 further includes a vehicle communication device 84, such as a dedicated short range communications (DSRC) device, which enables the host vehicle 10 to communicate with, for example, neighboring vehicles 16 or other terrestrial wireless communication devices 22. Therefore, the host vehicle 10 can share the information pertaining to the host vehicle 10, GPS information, road condition information and so on with neighboring vehicles 16, and the neighboring vehicles 16 can share their respective information with the host vehicle 10 and other neighboring vehicles 16 for purposes discussed herein. Furthermore, the host vehicle 10 and the neighboring vehicles 16 can share this information with a the communication network 20 which can, for example, store this information in a database or provide this information for access by other vehicles that may be traveling over the same road 14 in the near future, so that a controller 34 in those vehicles can assess traffic conditions, road conditions and so on.

The host vehicle 10 can also include features that are typically present in a vehicle, such as a cruise control system 88 and an entertainment system including, for example, a display 90, an audio system 92 and user controls 94 such as a keypad, microphone and other types of interface devices as understood in the art. The controller 34 can communicate with the cruise control system 88, the display 90, the audio system 92 and the user controls 94 via, for example, the CAN 36 or in any suitable manner for purposes as discussed herein.

Examples of operations that can be performed by the vehicle navigation system 12 will now be described with reference to FIGS. 3 through 6. It should be noted that certain steps of the operation discussed herein with regard to, for example, FIGS. 4 and 5, can be performed simultaneously or in any suitable order, and need not be performed in the specific order shown in the flowcharts of FIGS. 4 and 5.

Figure 4:
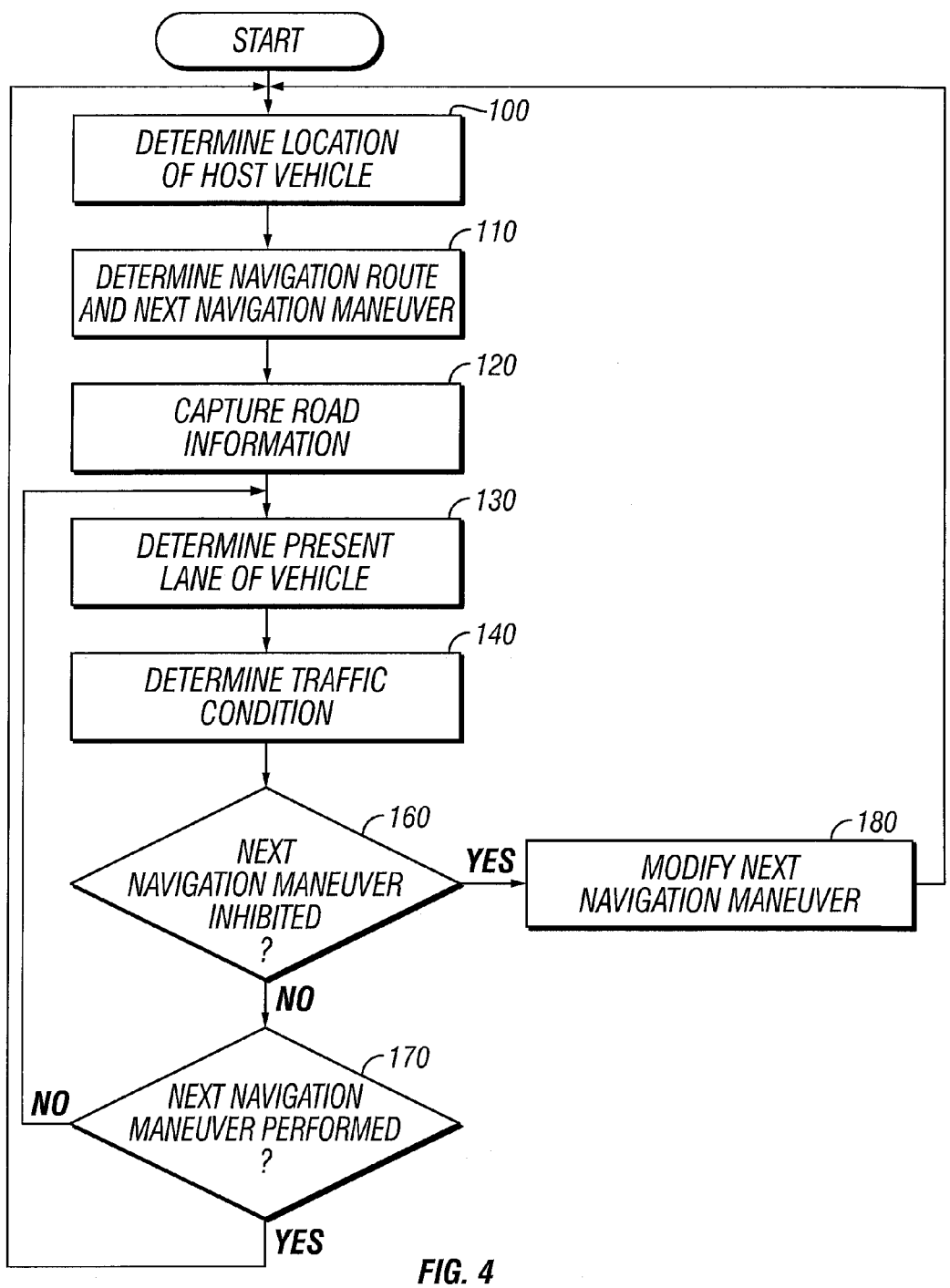
FIG. 4 is a flowchart illustrating an example of operations performed by the vehicle navigation system as shown in FIGS. 1 and 2.

As shown in the flowchart of FIG. 4, in step 100, the controller 34 receives information from, for example, the navigation unit 80 and determines a present location of a host vehicle 10, including information pertaining to the road 14 on which the host vehicle 10 is traveling. This information can include, for example, the identity of the road 14 and the path of the road 14. In step 110, the controller 34 determines a navigation route based on a destination that can be entered, for example, by the user via user controls 94, the present location of the host vehicle 10 and the directions of the roads 14, etc. Also in step 110, the controller 34 can determine a next navigation maneuver based on the navigation route and the present location of the host vehicle 10. In doing so, the controller 34 can set a reminder time (e.g., a first time) for presenting a reminder in the host vehicle 10 which can remind the driver of the host vehicle 10 to perform the next navigation maneuver. The controller 34 can provide the reminder via, for example, the display 90, the audio system 92, or both, in any suitable manner as understood in the art. For instance, the controller 34 can provide a visual instruction, an audio instruction, or both informing the driver to prepare for or begin the particular navigation maneuver at that first time. An example of the reminder can be an audio/visual message such as "move into right lane now as soon as the right lane is clear" or "commence right turn in one-quarter of a mile" as understood in the art.

Also, as discussed above, the imaging unit 70 can be continuously operating while the host vehicle 10 is running to capture road information pertaining to the road 14. Accordingly, for purposes of example, the controller 34 in step 120 can thus capture road information pertaining to the road 14 based on information received from the imaging unit 70 representing captured images of the road 14 and the general surroundings of the host vehicle 10 as discussed above, as well as based on information received from the detecting-and-ranging system 78 as discussed above.

Furthermore, in step 130, the controller 34 can determine a present lane of the road 14 in which the host vehicle 10 is traveling based on, for example, the road information received from the imaging unit 70 and the detecting-and-ranging system 78 as discussed above. For example, the controller 34 can operate the imaging unit 70 or any other type of visual capturing system to detect lane lines 72, 74R and 74L and rumble strips RS of the road 14 as shown in FIG. 3. Also, the controller 34 can operate the detecting-and-ranging system 78 to detect a position of neighboring barriers BR and neighboring vehicles 16 with respect to the host vehicle 10 as discussed above. With this road information, the controller 34 can determine the present lane of the road 14 in which the host vehicle 10 is travelling. In the example shown in FIG. 3, the host vehicle 10 is traveling in the left or passing lane 76L.

In addition, in step 140, the controller 34 can determine a traffic condition on the road 14 based on, for example, the road information received from the imaging unit 70 and the information received from the detecting-and-ranging system 78. In particular, in determining the traffic condition, the controller 34 can detect the presence of neighboring vehicles 16 on the road 14. Thus, the controller 34 can detect the presence, location, and travelling behavior of the neighboring vehicles 16 by, for example, operating the imaging unit 70 or any other type of visual capturing system to detect a position of neighboring vehicles 16 with respect to the host vehicle 10, and/or by operating the detecting-and-ranging system 78 to determine a position of each of the neighboring vehicles 16 with respect to the host vehicle 10.

Then, in step 160, the controller 34 can determine whether the traffic condition, for example, indicates that the presence of at least one of the neighboring vehicles 16 is inhibitive of an ability of the host vehicle 10 to perform the next navigation maneuver. If the presence of one or more neighboring vehicles 16 is not inhibitive of an ability of the host vehicle 10 to perform the next navigation maneuver, the controller 34 can present a conventional reminder to the driver of the host vehicle 10 to perform the next navigation maneuver at the first reminder time. According to another example, in the case the host vehicle 10 is travelling in a certain lane due to lane closures (e.g. presence of construction barriers), the road information received from the imaging unit 70 and the information received from the detecting-and-ranging system 78 can be indicative of the lane restriction by detecting the presence of barriers to what may be the lane required to perform the next navigation maneuver, and the controller 34 can conclude that the host vehicle 10 is in the appropriate lane, even though the host vehicle 10 is not in what would normally be the appropriate lane. The controller 34 can then determine in step 170 whether the next navigation maneuver has been performed. If the next navigation maneuver has been performed, the processing can then return to step 100 and repeat as discussed above. Alternatively, if the next navigation maneuver has not been performed, the processing returns to step 130 and repeats as discussed above.

However, if the controller 34 determines in step 160 that the presence of one or more neighboring vehicles 16 is inhibiting or may be inhibitive of an ability of the host vehicle 10 to perform the next navigation maneuver, the processing can continue to step 180 during which the controller 34 can modify the next navigation maneuver based on the navigation route for the host vehicle 10, the present lane in which the host vehicle 10 is traveling, and the traffic condition of the road 14. That is, in step 180, the controller 34 can modify the next navigation maneuver by selecting a different navigation maneuver as the modified next navigation maneuver.

For example, the controller 34 can modify the next navigation maneuver by modifying the reminder time to be a second time that is earlier than the first time. For instance, if the controller 34 has determined in step 140 that the traffic condition is a heavy traffic condition, the controller 34 can modify the next navigation maneuver by modifying the reminder time to be the second time that is earlier than the first time. The controller 34 can determine that the traffic condition is a heavy traffic condition by, for example, detecting a consistent acceleration and deceleration pattern of operation of the host vehicle 10 or, in other words, a constant acceleration and braking of the host vehicle 10 indicating bumper-to-bumper type traffic. Therefore, the controller 34 can present a reminder in the host vehicle 10 at this second time to remind the driver of the host vehicle 10 to perform the next navigation maneuver sooner to give the driver adequate time to prepare to perform the next navigation maneuver. For instance, the controller 34 can provide a visual instruction, and audio instruction, or both informing the driver to begin the particular navigation maneuver at this earlier time. An example of the reminder can be an audio/visual message such as "traffic ahead, slow down and move into right lane as soon as right lane is clear" as understood in the art.

In addition, the controller 34 can determine the next navigation maneuver by determining an appropriate lane in which the host vehicle 10 is to travel, to perform the next navigation maneuver. When the controller 34 determines that the appropriate lane is different from the present lane, the controller 34 can modify the next maneuver by providing instruction to the driver to move the host vehicle 10 into the appropriate lane.

For example, as shown in FIG. 3, the host vehicle 10 is traveling in the left lane 76L. For purposes of this example, the next navigation maneuver is to use an upcoming right hand exit. Therefore, the controller 34 can provide a visual instruction, and audio instruction, or both as discussed above to inform the driver to begin a particular navigation maneuver to steer the host vehicle 10 into the right lane 76R well in advance (e.g. the second time which is earlier than the first time) of the exit. The controller 34 can further determine based on, for example, signals provided by the steering wheel 40, the torque sensor 42, the steering angle sensor 44 and/or the turn signal switch 48 of the steering system 30 and/or signals provided by the braking system 32 whether the driver is attempting to steer the host vehicle 10 into the right lane 76R. The controller 34 can provide additional warnings and information pertaining to the presence of neighboring vehicles 16, obstacles and so on as discussed above depending on whether the driver is attempting to steer the host vehicle 10 into the right lane 76R.

Figure 5:
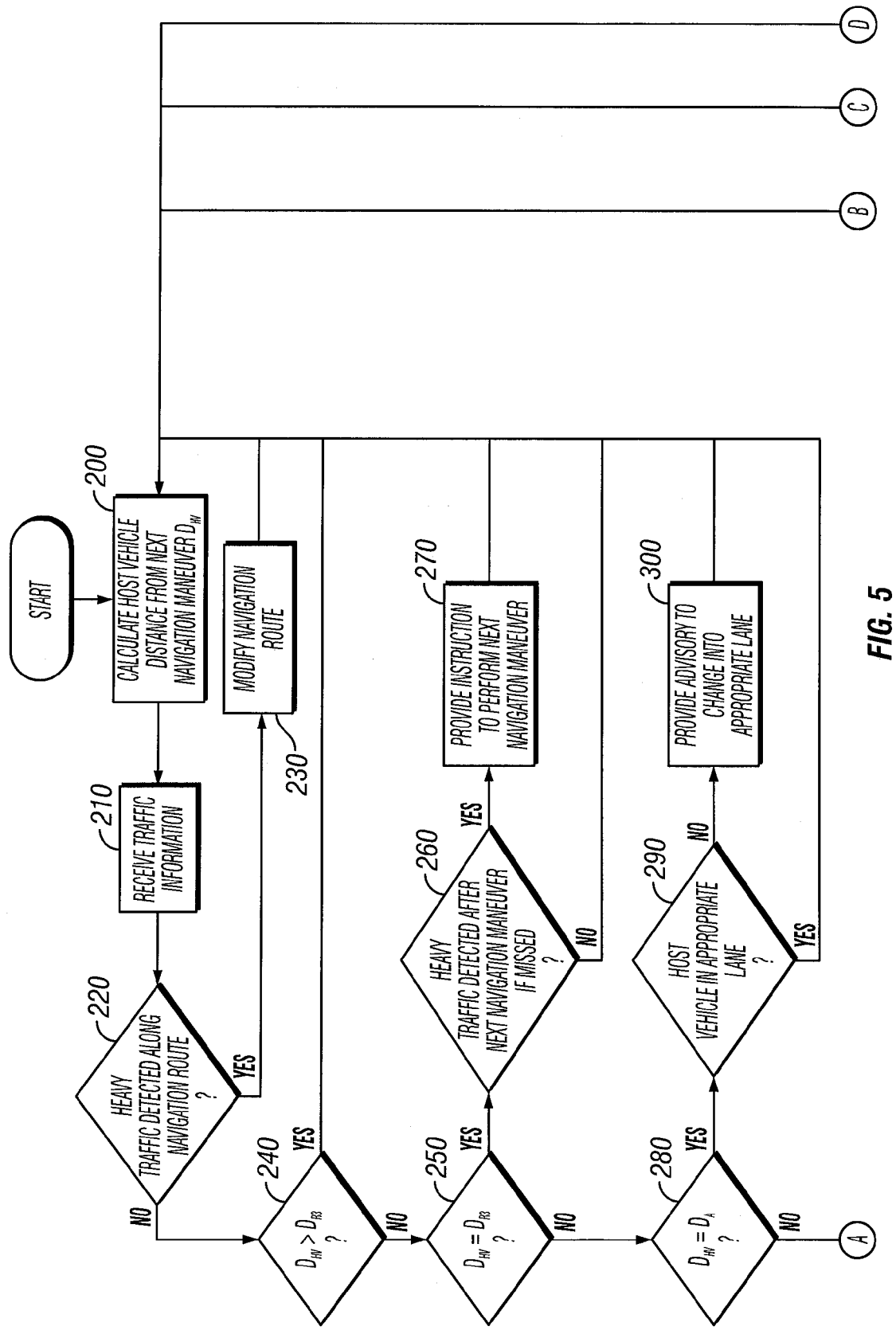
FIG. 5 is a flowchart illustrating a more detailed working example of operations performed by the vehicle navigation system as shown in FIGS. 1 and 2.
Figure 5:
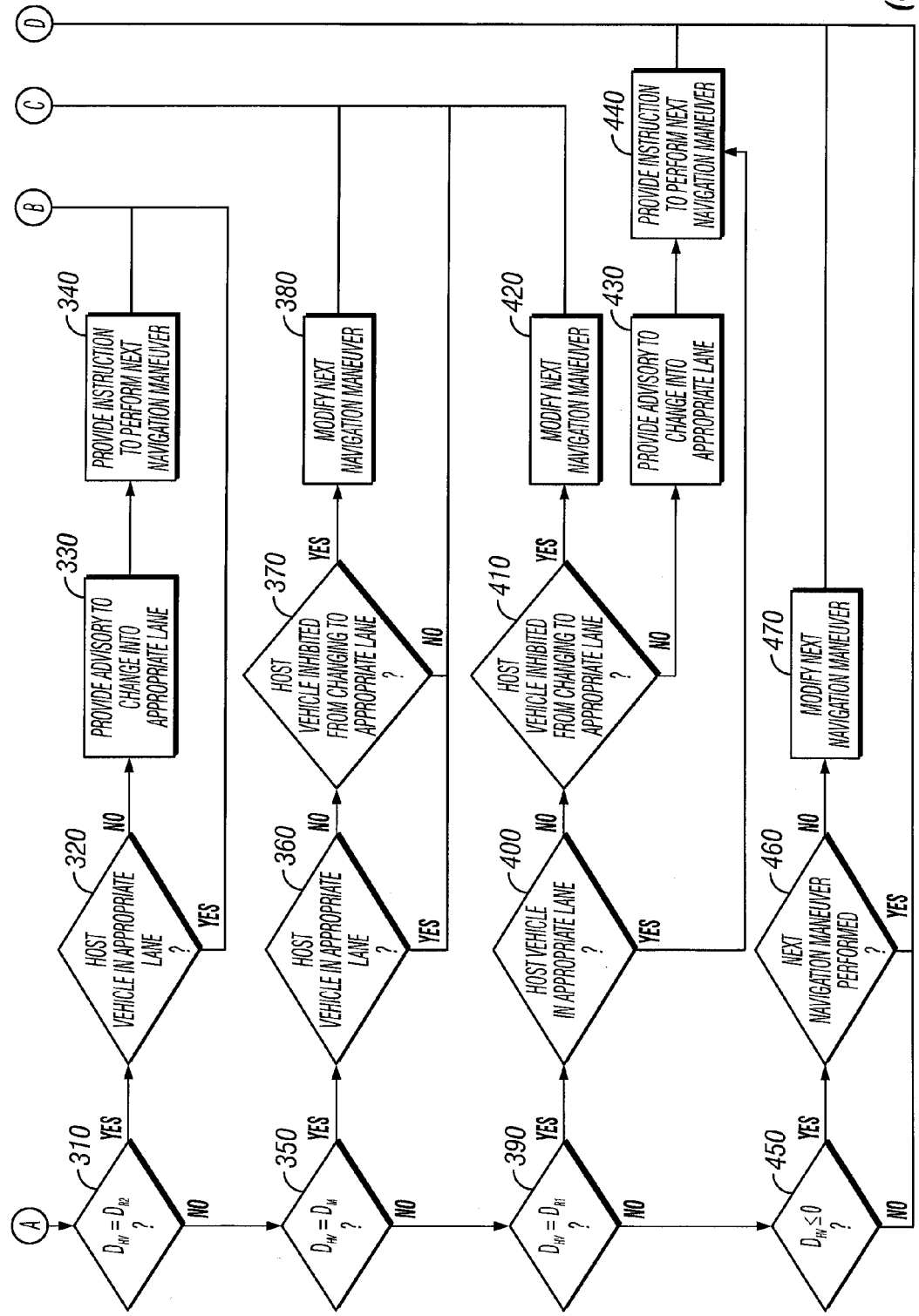
Figure 6:
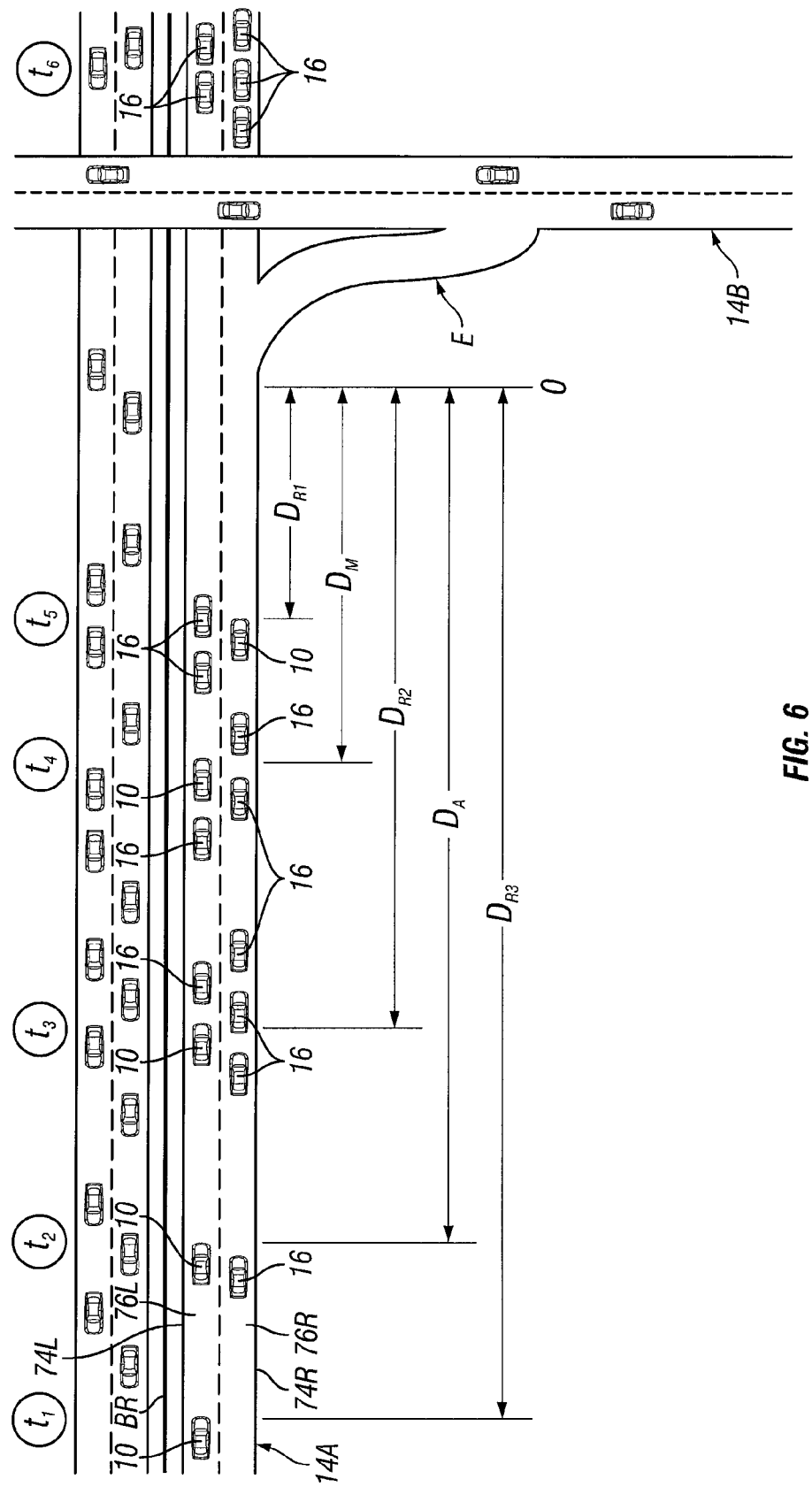
FIG. 6 is a more detailed diagrammatic view of the vehicle shown in FIGS. 1 and 2 traveling along a road while performing the operations as shown in FIG. 5.

A working example of the embodiments discussed herein will now be described with reference to FIGS. 5 and 6. Beginning at step 200 of FIG. 5, the controller 34 calculates the current host vehicle distance $D_{HV}$ from the next navigation maneuver based on the current location of the host vehicle 10 and the location of the next navigation maneuver which are determined as discussed herein. The processing then continues to step 210, where the controller 34 can receive traffic information via communication with, for example, neighboring vehicles 16, terrestrial wireless communication devices 22, or satellite communication devices 24 as described above. Then, in step 220, the controller 34 can "look ahead" to determine whether there is a heavy traffic condition along the navigation route based on the received traffic information. If there is a heavy traffic condition ahead along the navigation route, the controller 34 can then modify the navigation route to guide the driver of the host vehicle 10 along a different route to avoid the heavy traffic condition in step 230, and then start the processing over at step 200. Thus, the driver of the host vehicle 10 can become informed of an impending heavy traffic situation along the current navigation route, and then be informed of a revised navigation route in time to avoid the heavy traffic situation. If there is no detected heavy traffic condition in step 220, the processing will instead continue on to step 240.

In step 240, the controller 34 will determine whether the current host vehicle distance $D_{HV}$ is greater than a third reminder distance $D_{R3}$ ($D_{HV}=D_{R3}$). If the host vehicle 10 has not yet reached the third reminder distance $D_{R3}$ (YES at step 240), the processing will return to step 200. If the current host vehicle distance $D_{HV}$ is no longer less than the third reminder distance $D_{R3}$ (NO at step 240), the controller 34 will determine whether the host vehicle 10 is at the third reminder distance $D_{R3}$ ($D_{HV}=D_{R3}$). If the host vehicle 10 is at the third reminder distance $D_{R3}$ (YES at step 250), as shown in FIG. 6 at time $t_6$, the controller 34 will then determine in step 260 whether the host vehicle 10 will encounter a heavy traffic condition beyond the next navigation maneuver if the next navigation maneuver is missed. If there is heavy traffic on the road beyond the next navigation maneuver (YES at step 260), which is shown in FIG. 6 at time $t_6$, the controller 34 will control the display 90 and/or audio system 92 to provide a reminder of the next navigation maneuver when the host vehicle 10 is at or just beyond the third reminder distance $D_{R3}$ in step 270. The third reminder distance $D_{R3}$ is greater than a first reminder distance $D_{R1}$ corresponding to a conventional reminder distance used by navigation systems as known in the art. If there is no heavy traffic condition on the road ahead (NO in step 260), no early reminder is needed at that time, and thus the processing returns to step 200.

If the host vehicle 10 is beyond the third reminder distance $D_{R3}$ (NO at step 250), the controller 34 will determine in step 280 whether the host vehicle 10 has reached an advisory distance $D_A$ ($D_{HV}=D_A$). If the host vehicle 10 is at the advisory distance $D_A$ (YES in step 280), the controller 34 will then determine in step 290 whether the host vehicle 10 is travelling in the appropriate lane to perform the next navigation maneuver. In the example of FIG. 6 at time $t_2$, the host vehicle 10 is shown in the left lane 76L with a neighboring vehicle 16 traveling next to the host vehicle 10 in the right lane 76R. Since the next navigation maneuver is to travel onto the upcoming exit ramp E from the right lane 76R to leave first road 14A and enter onto second road 14B, the appropriate lane for the next navigation maneuver is the right lane 76R. As shown in FIG. 6 at time $t_2$, the host vehicle 10 is not in the appropriate lane (NO at step 290), and thus should be advised to change lanes. Accordingly, in step 300, the controller 34 will provide an advisory via the display 90 and/or audio system 92 to change into the appropriate lane, and then the processing will return to step 200. If the host vehicle 10 was determined to be in the appropriate lane (YES at step 290), the processing would return to step 200.

When the host vehicle 10 is beyond the advisory distance $D_A$ (NO at step 280), the controller 34 will then proceed to step 310 to determine whether the host vehicle 10 is at a second reminder distance $D_{R2}$ ($D_{HV}=D_{R2}$) which is less than the third reminder distance $D_{R3}$, but greater than the first reminder distance $D_{R1}$. If the host vehicle 10 is at the second reminder distance $D_{R2}$ (YES at step 310), as shown in FIG. 6 at time $t_3$, the processing will proceed to step 320 in which the controller 34 will determine whether the vehicle is in the appropriate lane for the next navigation maneuver, as described above. As shown in FIG. 6 at time $t_3$, the host vehicle 10 has remained in the left lane 76L, which is not the appropriate lane in this example. In this case (NO in step 320), the controller 34 may provide a reminder including an advisory to change to the appropriate lane in step 330 along with an instruction to perform the next navigation maneuver in step 340; or alternatively the controller 34 may provide a reminder including only the instruction to perform the next navigation maneuver in step 340 and skip step 330. By providing the reminder at the second reminder distance $D_{R2}$, the driver of the host vehicle 10 may have more time to react to the traffic conditions and correctly position the host vehicle 10 for the next navigation maneuver than with a traditional navigation system where the only reminder is given nearer to the next navigation maneuver (e.g. at the first reminder distance $D_{R1}$). On the other hand, if the host vehicle 10 is determined to be in the appropriate lane when at the second reminder distance $D_{R2}$ (YES at step 320), the processing will return to step 200.

If the host vehicle 10 is beyond the second reminder distance $D_{R2}$ (NO at step 310), the controller 34 will determine at step 350 whether the host vehicle 10 has reached the maneuver modification distance $D_M$ ($D_{HV}=D_M$), which is between the first reminder distance $D_{R1}$ and the second reminder distance $D_{R2}$ in this example. At this point, if the host vehicle 10 is determined to be unable to perform the next navigation maneuver, the navigation route or the next navigation maneuver may be modified to ease driver anxiety associated with missing a navigation maneuver. Thus, if the controller 34 determines that the host vehicle 10 is at the maneuver modification distance $D_M$ (YES at step 350), the controller 34 will then determine whether the host vehicle 10 is in the appropriate lane in step 360. In this example, as shown in FIG. 6 at time $t_4$, the host vehicle 10 remains in the inappropriate lane (left lane 76L), and thus is judged to be not in the appropriate lane (NO in step 360). Processing will then proceed to step 370 in which the proximity of neighboring vehicles 16 can be detected using a detecting-and-ranging system 78 or imaging unit 70, for example, to determine whether the host vehicle 10 is inhibited from changing to the correct lane. At time $t_4$ in FIG. 6, several neighboring vehicles 16 surround the host vehicle 10 and inhibit movement to the appropriate lane (right lane 76R). Thus, the controller 34 would judge the host vehicle 10 is inhibited (YES at step 370), and will proceed to step 380 in which the navigation route or the next navigation maneuver is modified to provide the next best route or maneuver at a time before reaching the conventional reminder distance (e.g. the first reminder distance $D_{R1}$), thus relieving the driver of the anxiety of missing the next navigation maneuver. Processing would then return to step 200. However, if the host vehicle 10 is judged to be in the appropriate lane (YES at step 360) or is uninhibited from entering the appropriate lane (NO at step 370), processing can return immediately to step 200.

If the host vehicle 10 is beyond the maneuver modification distance $D_M$ (NO at step 350), the controller 34 will then proceed to step 390 to determine when the host vehicle 10 reaches the first reminder distance $D_{R1}$ ($D_{HV}=D_{R1}$). Upon reaching the first reminder distance (YES at step 390), as described above, the controller 34 will determine whether the host vehicle 10 is in the appropriate lane. If the host vehicle 10 is in the appropriate lane (YES at step 400), such as in the example of FIG. 6 at time $T_5$, the controller 34 will provide the instruction to perform the next navigation maneuver at step 440, and then return to step 200. On the other hand, if the host vehicle 10 had changed lanes between the maneuver modification distance $D_M$ and the first reminder distance $D_{R1}$ to the inappropriate lane (NO at step 400), the controller 34 will determine whether the host vehicle 10 is inhibited from returning to the appropriate lane at step 410. If the host vehicle 10 is inhibited (YES at step 410), the navigation route or next navigation maneuver will be modified at step 420, as described above, and processing will return to step 200. Otherwise, if the host vehicle 10 is able to return to the appropriate lane in time to make the next navigation maneuver (NO at step 410), the controller 34 will provide an advisory to change into the appropriate lane at step 430, provide the instruction to perform the next navigation maneuver at step 440, and then return to step 200.

Once the host vehicle 10 passes the next navigation maneuver point ($D_{HV}<0$), as judged by the controller 34 at step 450 (YES at step 450), the controller 34 will then determine whether the host vehicle 10 successfully performed or missed the next navigation maneuver at step 460. If the host vehicle 10 performed the next navigation maneuver (YES at step 460), processing will return to step 200. On the other hand, if the host vehicle 10 missed the next navigation maneuver (NO at step 460), the controller 34 will modify the navigation route or the next navigation maneuver at step 470 as described above, and processing will return to step 200.

Generally, where reference is made to providing a reminder of the next navigation maneuver and providing an advisory to prepare to perform the next navigation maneuver (e.g. change to the appropriate lane), it can be understood that the reminder or advisory can include any combination of the reminder and advisory. Additionally, where reference is made to modification of the next navigation maneuver, such modification is not limited to just the next navigation maneuver, but may also include modifying the entire navigation route including the next navigation maneuver. Also, it can be understood that when modifying the next navigation maneuver or navigation route, the controller 34 can provide a notification of the new navigation maneuver or update to the navigation route as via the display 90 and/or the audio system 92 as described above.

Accordingly, as can be appreciated from the above, the vehicle navigation system 12 can improve the ability of a driver to maneuver the host vehicle 10 based on information pertaining to the location and condition of the host vehicle 10 and the host vehicle's surroundings, such as road conditions and the presence of traffic and other obstacles.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle navigation method comprising:
    determining with a controller a host vehicle trajectory and a present host vehicle location of a host vehicle, including a road on which the host vehicle is traveling;
    determining with the controller a plurality of navigation routes based on a destination and the present host vehicle location;
    determining with the controller traffic information pertaining to the road and pertaining to each of the plurality of navigation routes;
    selecting with the controller an optimal navigation route from the plurality of navigation routes;
    determining with the controller a next navigation maneuver based on the optimal navigation route and the present host vehicle location;
    determining with the controller a next maneuver instruction, a next maneuver location, and a first reminder distance from the next maneuver location based on the next navigation maneuver;
    determining with the controller whether an adverse traffic condition exists at a missed maneuver location that is not on the optimal navigation route and is beyond the next maneuver location;
    determining with the controller, a second reminder distance from the next maneuver location, the second reminder distance being greater than the first reminder distance; and
    presenting with a user interface the next maneuver instruction when the host vehicle location is at the second reminder distance and the adverse traffic condition exists at the missed maneuver location.

2. The vehicle navigation method according to claim 1, further comprising:
    presenting with the user interface an adverse traffic condition warning when the host vehicle location is at the second reminder distance and the adverse traffic condition exists at the missed maneuver location.

3. The vehicle navigation method according to claim 1, further comprising:
    determining an appropriate lane pertaining to the next navigation maneuver;
    capturing with a road condition determination unit road condition information pertaining to an area of the road adjacent the host vehicle;
    determining with the controller a host vehicle lane of the road in which the host vehicle is traveling based on the road condition information; and
    determining with the controller whether the host vehicle lane is the appropriate lane.

4. The vehicle navigation method according to claim 3, further comprising:
    determining with the controller an advisory distance from the next maneuver location, the advisory distance being greater than the first reminder distance and less than the second reminder distance; and
    presenting with the user interface a lane change instruction when the host vehicle location is at the advisory reminder distance and the host vehicle lane is different from the appropriate lane.

5. The vehicle navigation method according to claim 4, further comprising:
    determining with the controller a third reminder distance from the next maneuver location, the third reminder distance being greater than the first reminder distance and less than the advisory distance; and
    presenting with the user interface the lane change instruction along with the next maneuver instruction when the host vehicle location is at the third reminder distance and the host vehicle lane is different from the appropriate lane.

6. The vehicle navigation method according to claim 5, further comprising:
    determining with the controller a modification distance from the next maneuver location, the modification distance being greater than the first reminder distance and less than the third reminder distance;
    determining with the controller whether the host vehicle is prevented from changing to the appropriate lane when the host vehicle lane is different from the appropriate lane; and
    determining with the controller a modified next navigation maneuver that is different from the next navigation maneuver when the host vehicle location is at the modification distance, the host vehicle lane is different from the appropriate lane, and the host vehicle is determined to be prevented from changing to the appropriate lane.

7. The vehicle navigation method according to claim 6, further comprising:
    determining with the controller the modified next navigation maneuver when the host vehicle location is at the first reminder distance, the host vehicle lane is different from the appropriate lane, and the host vehicle is determined to be prevented from changing to the appropriate lane;
    presenting with the user interface the lane change instruction along with the next maneuver instruction when the host vehicle location is at the first reminder distance, the host vehicle lane is different from the appropriate lane, and the host vehicle is determined not to be prevented from changing to the appropriate lane; and presenting with the user interface the next maneuver instruction when the host vehicle location is at the first reminder distance and the host vehicle lane is the appropriate lane.

8. The vehicle navigation method according to claim 7, further comprising:

determining with the controller whether the next navigation maneuver was performed; and determining with the controller the modified next navigation maneuver when the host vehicle location is at the next maneuver location and the next navigation maneuver was not performed.

9. The vehicle navigation method according to claim 7, wherein the capturing of road condition information includes detecting a presence of at least one of neighboring vehicles and stationary objects positioned adjacent to the host vehicle lane at the host vehicle location.

10. The vehicle navigation method according to claim 9, further comprising:

determining with the controller the host vehicle lane is a second appropriate lane when the host vehicle location is at the modification distance, the host vehicle lane is different from the first appropriate lane, and the host vehicle is determined to be prevented from changing to the first appropriate lane by stationary objects detected to be positioned between the host vehicle lane and the appropriate lane; and modifying with the controller the first appropriate lane to be the second appropriate lane.

11. The vehicle navigation method according to claim 7, further comprising:

presenting with the user interface an avoid lane change instruction when the host vehicle location is at the first reminder distance, the host vehicle lane is different from the appropriate lane, and the host vehicle is determined to be prevented from changing to the appropriate lane.

12. The vehicle navigation method according to claim 6, wherein the capturing of road condition information includes detecting a presence of at least one of neighboring vehicles and stationary objects positioned adjacent to the host vehicle lane at the host vehicle location.

13. The vehicle navigation method according to claim 12, further comprising:

determining with the controller the host vehicle lane is a second appropriate lane when the host vehicle location is at the modification distance, the host vehicle lane is different from the first appropriate lane, and the host vehicle is determined to be prevented from changing to the first appropriate lane by stationary objects detected to be positioned between the host vehicle lane and the appropriate lane; and modifying with the controller the first appropriate lane to be the second appropriate lane.

14. The vehicle navigation method according to claim 6, further comprising:

presenting with the user interface an avoid lane change instruction when the host vehicle location is at the modification distance, the host vehicle lane is different from the appropriate lane, and the host vehicle is determined to be prevented from changing to the appropriate lane.

15. The vehicle navigation method according to claim 3, further comprising:

determining with the controller a third reminder distance from the next maneuver location, the third reminder distance being greater than the first reminder distance and less than the second reminder distance; and presenting with the user interface a lane change instruction along with the next maneuver instruction when the host vehicle location is at the third reminder distance and the host vehicle lane is different from the appropriate lane.

16. The vehicle navigation method according to claim 3, further comprising:

determining with the controller a modification distance from the next maneuver location, the modification distance being greater than the first reminder distance and less than the second reminder distance;

determining with the controller whether the host vehicle is prevented from changing to the appropriate lane when the host vehicle lane is different from the appropriate lane; and determining with the controller a modified next navigation maneuver that is different from the next navigation maneuver when the host vehicle location is at the modification distance, the host vehicle lane is different from the appropriate lane, and the host vehicle is determined to be prevented from changing to the appropriate lane.

17. The vehicle navigation method according to claim 16, wherein the capturing of road condition information includes detecting a presence of at least one of neighboring vehicles and stationary objects positioned adjacent to the host vehicle lane at the host vehicle location.

18. The vehicle navigation method according to claim 17, further comprising:

determining with the controller the host vehicle lane is a second appropriate lane when the host vehicle location is at the modification distance, the host vehicle lane is different from the first appropriate lane, and the host vehicle is determined to be prevented from changing to the first appropriate lane by stationary objects detected to be positioned between the host vehicle lane and the appropriate lane; and modifying with the controller the first appropriate lane to be the second appropriate lane.

19. The vehicle navigation method according to claim 16, further comprising:

presenting with the user interface an avoid lane change instruction when the host vehicle location is at the modification distance, the host vehicle lane is different from the appropriate lane, and the host vehicle is determined to be prevented from changing to the appropriate lane.

20. The vehicle navigation method according to claim 3, further comprising:

determining with the controller a modified next navigation maneuver that is different from the next navigation maneuver when the host vehicle location is at the first reminder distance, the host vehicle lane is different from the appropriate lane, and the host vehicle is determined to be prevented from changing to the appropriate lane;

presenting with the user interface a lane change instruction along with the next maneuver instruction when the host vehicle location is at the first reminder distance, the host vehicle lane is different from the appropriate lane, and the host vehicle is determined not to be prevented from changing to the appropriate lane; and presenting with the user interface the next maneuver instruction when the host vehicle location is at the first reminder distance and the host vehicle lane is the appropriate lane.

21. The vehicle navigation method according to claim 20, wherein
the capturing of road condition information includes detecting a presence of at least one of neighboring vehicles and stationary objects positioned adjacent to the host vehicle lane at the host vehicle location.

22. The vehicle navigation method according to claim 21, further comprising:
determining with the controller the host vehicle lane is a second appropriate lane when the host vehicle location is at the first reminder distance, the host vehicle lane is different from the first appropriate lane, and the host vehicle is determined to be prevented from changing to the first appropriate lane by stationary objects detected to be positioned between the host vehicle lane and the appropriate lane; and
modifying with the controller the first appropriate lane to be the second appropriate lane.

23. The vehicle navigation method according to claim 20, further comprising:
presenting with the user interface an avoid lane change instruction when the host vehicle location is at the first reminder distance, the host vehicle lane is different from the appropriate lane, and the host vehicle is determined to be prevented from changing to the appropriate lane.

24. The vehicle navigation method according to claim 1, further comprising:
determining with the controller whether the next navigation maneuver was performed; and
determining with the controller a modified next navigation maneuver that is different from the next navigation maneuver when the host vehicle location is at the next maneuver location and the next navigation maneuver was not performed.

25. A vehicle navigation method comprising:
determining with a controller a host vehicle trajectory and a present host vehicle location of a host vehicle, including a road on which the host vehicle is traveling;
determining with the controller a plurality of navigation routes based on a destination and the present host vehicle location;
determining with the controller traffic information pertaining to the road and pertaining to each of the plurality of navigation routes;
selecting with the controller an optimal navigation route from the plurality of navigation routes;
determining with the controller a next navigation maneuver based on the optimal navigation route and the present host vehicle location;
determining with the controller a next maneuver instruction, a next maneuver location, and a first reminder distance from the next maneuver location based on the next navigation maneuver;
determining with the controller whether an adverse traffic condition exists at a missed maneuver location on the road beyond the next maneuver location;
determining with the controller, a second reminder distance from the next maneuver location, the second reminder distance being greater than the first reminder distance;
determining an appropriate lane pertaining to the next navigation maneuver;
capturing with a road condition determination unit road condition information pertaining to an area of the road adjacent the host vehicle;
determining with the controller a host vehicle lane of the road in which the host vehicle is traveling based on the road condition information;
determining with the controller whether the host vehicle lane is the appropriate lane;
determining with the controller an advisory distance from the next maneuver location, the advisory distance being greater than the first reminder distance and less than the second reminder distance;
presenting with the user interface a lane change instruction when the host vehicle location is at the advisory reminder distance and the host vehicle lane is different from the appropriate lane; and
presenting with a user interface the next maneuver instruction when the host vehicle location is at the second reminder distance and the adverse traffic condition exists at the missed maneuver location.

26. A vehicle navigation method comprising:
determining with a controller a host vehicle trajectory and a present host vehicle location of a host vehicle, including a road on which the host vehicle is traveling;
determining with the controller a plurality of navigation routes based on a destination and the present host vehicle location;
determining with the controller traffic information pertaining to the road and pertaining to each of the plurality of navigation routes;
selecting with the controller an optimal navigation route from the plurality of navigation routes;
determining with the controller a next navigation maneuver based on the optimal navigation route and the present host vehicle location;
determining with the controller a next maneuver instruction, a next maneuver location, and a first reminder distance from the next maneuver location based on the next navigation maneuver;
determining with the controller whether an adverse traffic condition exists at a missed maneuver location on the road beyond the next maneuver location;
determining with the controller, a second reminder distance from the next maneuver location, the second reminder distance being greater than the first reminder distance;
determining an appropriate lane pertaining to the next navigation maneuver;
capturing with a road condition determination unit road condition information pertaining to an area of the road adjacent the host vehicle;
determining with the controller a host vehicle lane of the road in which the host vehicle is traveling based on the road condition information;
determining with the controller whether the host vehicle lane is the appropriate lane;
determining with the controller a third reminder distance from the next maneuver location, the third reminder distance being greater than the first reminder distance and less than the second reminder distance;
presenting with the user interface a lane change instruction along with the next maneuver instruction when the host vehicle location is at the third reminder distance and the host vehicle lane is different from the appropriate lane; and
presenting with a user interface the next maneuver instruction when the host vehicle location is at the second reminder distance and the adverse traffic condition exists at the missed maneuver location.

* * * * *